United States Patent [19]

Epstein

[11] Patent Number: 4,675,772
[45] Date of Patent: Jun. 23, 1987

[54] PROTECTOR NETWORK FOR A-C EQUIPMENT

[76] Inventor: Barry M. Epstein, 7523 Cliffbrook, Dallas, Tex. 75240

[21] Appl. No.: 843,812

[22] Filed: Mar. 27, 1986

Related U.S. Application Data

[63] Continuation of Ser. No. 607,650, May 7, 1984, abandoned, which is a continuation of Ser. No. 287,095, Jul. 24, 1981, abandoned.

[51] Int. Cl.$^4$ ............................................. H02H 9/04
[52] U.S. Cl. ........................................ 361/56; 361/91; 361/111; 361/118
[58] Field of Search ................. 361/56, 91, 110, 111, 361/113, 118, 119, 54, 55; 333/12, 176, 119, 202

[56] References Cited

U.S. PATENT DOCUMENTS

| | | | |
|---|---|---|---|
| 3,372,285 | 3/1968 | Blazek et al. | 361/56 X |
| 3,693,053 | 9/1972 | Anderson | 361/56 X |
| 3,793,535 | 2/1974 | Chowdhuri | 361/56 X |
| 4,021,759 | 5/1977 | Campi | 361/56 X |
| 4,023,071 | 5/1977 | Fussell | 361/56 |
| 4,068,282 | 1/1978 | Rigollet | 361/111 X |
| 4,198,613 | 4/1980 | Whitley | 361/56 X |
| 4,259,705 | 3/1981 | Stiffer | 361/56 |

FOREIGN PATENT DOCUMENTS 1538324 11/1979 Fed. Rep. of Germany ........ 361/56

Primary Examiner—A. D. Pellinen
Assistant Examiner—Jeffrey A. Gaffin
Attorney, Agent, or Firm—Kenneth R. Glaser

[57] ABSTRACT

Disclosed is a combination surge voltage protector and filter network for protection of single and polyphase loads, the network including a pair of surge voltage suppresors respectively disposed on opposite sides of, and across, an L-C filter. Additional voltage suppressors and capacitive filters connected between phases and/or between neutral and ground provide additional load protection.

3 Claims, 4 Drawing Figures

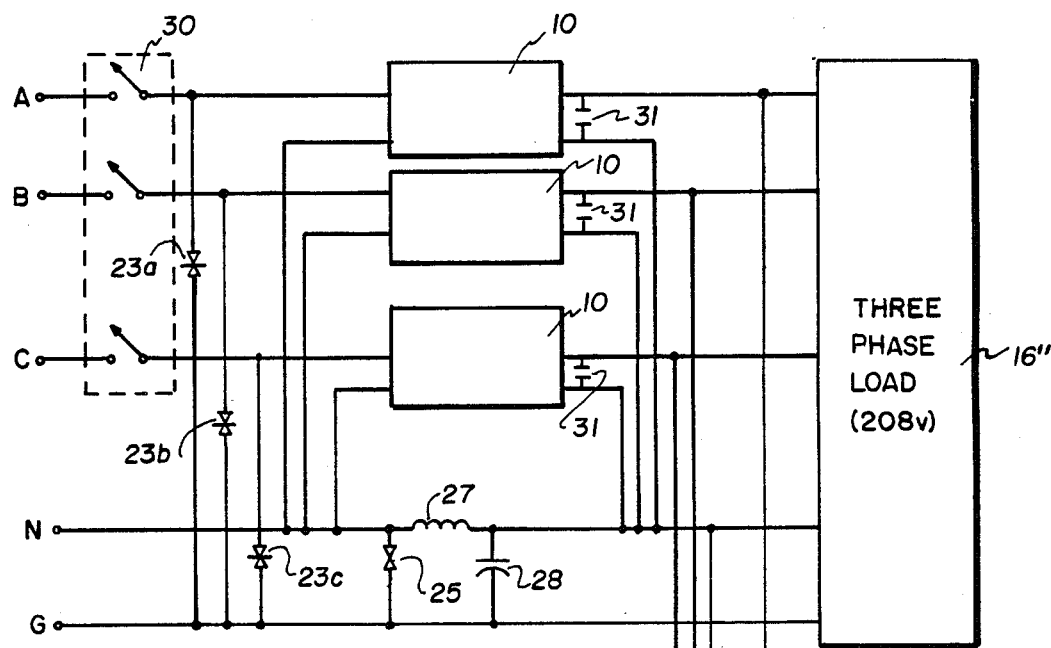
FIG. 4
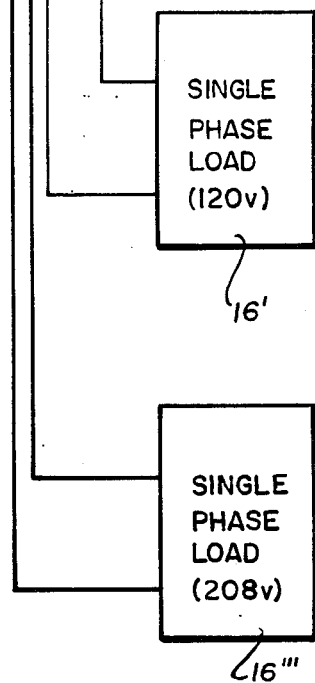

PROTECTOR NETWORK FOR A-C EQUIPMENT

This is a continuation of co-pending application Ser. No. 607,650 filed on May 7, 1984 now abandoned which is a continuation of application Ser. No. 287,095, filed 7/24/81, now abandoned.

This invention relates to protective apparatus for a-c equipment, more particularly to protective networks for protecting sensitive communication and power installations and other types of a-c loads from damaging power surges and transients, and even more particularly to combination filter and voltage surge suppressor networks for protecting such equipment.

There are many applications where it is necessary to protect a-c load equipment from power surges and voltage transients which could deleteriously affect and damage such equipment. This protection is particularly important for equipment comprising highly sensitive or complex multiple loads susceptible to electrical noise. For example, modern-day sophisticated data processing equipment includes highly sensitive electronic components which are particularly susceptible to damage or loss of stored data therein due to reactive voltage spikes occurring as a result of power surges in the feeder lines, switching transients, or as a consequence of external causes such as lightning or corona discharges or merely due to the internal circuitry itself. Some of these conditions can also occur with respect to, and thus damage, sophisticated telecommunication and telephone equipment installations.

Numerous types of protective networks have been designed in an attempt to protect such equipment from these power surges and transients; but existing protective networks have not been entirely satisfactory for all conditions of service. Specifically, it would be desirable that such protective networks be adapted for convenient installation with existing equipment, prevent the deleterious effects of such surges and transients occurring at the source, or as a consequence of the circuit breaker switching, as well as being effective to prevent reactive spike build-up at the load side of the network. Furthermore, it would be desirable to provide such surge and transient protection in synergistic combination with power filtering, as well as to adapt such protective networks for convenient installation with, and therefore protection of, multiple type loads, i.e. 3-phase and single-phase loads.

It is therefore the principal object of the present invention to provide new and improved power surge and transient voltage protection for a-c load equipment.

It is another object of the present invention to provide, for a-c loads, protection against deleterious effects of power surges, voltage transients, and respective spikes from both the source and load.

It is a still further object of the present invention to provide power surge and transient voltage protection in synergistic combination with power filtering.

It is an even still further object of the present invention to provide new and improved protective networks for convenient installation of multiple type a-c loads.

In accordance with those and other objects, the present invention is directed to a combination surge voltage protector and filter network adapted for connection between the voltage source and input to an a-c load. The network includes an L-C filter with a pair of surge voltage suppressors respectively disposed on opposite sides of, and across, the filter. In accordance with preferred alternate embodiments of the invention, the voltage suppressors of the network are connected across the supply line(s) and neutral, as well as between neutral and ground, of a single phase or polyphase system. Provision is made for allowing for the protection of multi-type loads.

For a more complete understanding of the invention, as well as further objects, advantages and features thereof, reference may now be had to the following detailed description taken in conjunction with the accompanying drawings, wherein like numerals refer to like elements, and in which:

FIG. 4 is an illustration of the use of the network of the invention for simultaneous protection of multi-type loads.

Figure 1:
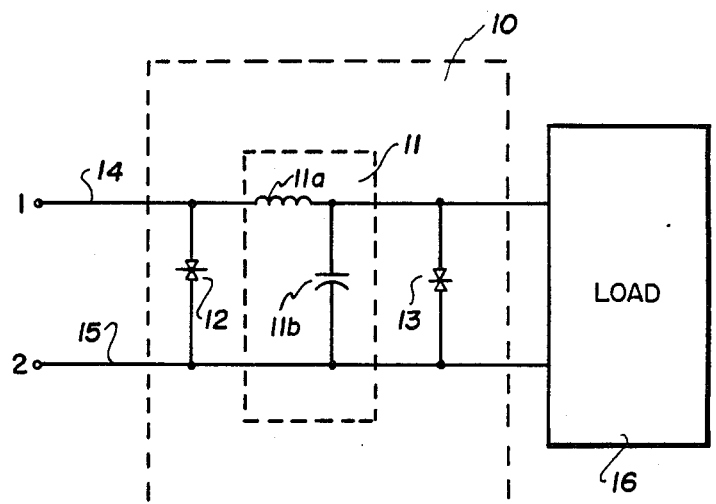
FIG. 1 is a schematic diagram illustrating the basic surge voltage protector and filter network of the present invention.

Referring initially to FIG. 1, the surge voltage protector and filter network of the present invention is depicted by the reference numeral 10 and comprises an L-C filter portion 11 and a pair of voltage suppressors 12 and 13. The voltage suppressors 12 and 13 are connected across the lines 14 and 15 supplying a-c power from the input terminals 1 and 2 to a load 16.

Each of the suppressors 12 and 13 can be any one of a number of devices presently on the market which is effectively open-circuited when voltages below a predetermined minimum appear across their respective terminals and which exhibit a limited degree of conduction when the voltage across such terminals exceeds such minimum, one such type device being a metal-oxide varistor. Thus, upon the occurrence of an excessive voltage across the particular suppressor, the effective resistance thereof is reduced, thereby shunting the resulting excessive current through the suppressor and reducing the voltage there-across. As a consequence, the suppressor 12 is principally effective to protect the load against power surges and voltage transients at the "source" side of the network (due to such things as input power surges, circuit breaker switching, lightning discharges, etc.); while the suppressor 13 is principally effective to prevent reactive spike voltage build-up as a consequence of conditions occurring in the load 16 or between the load and filter portion 11. The predetermined minimum breakdown voltage of each of the suppressors is that voltage, above which would be damaging to the load 16; and preferably, the source protector 12 should have a higher current carrying capability than the load protector 13. Additional filtering of the input power is then effected by the filter network portion 11 comprising inductor 11a and capacitor 11b.

Figure 2:
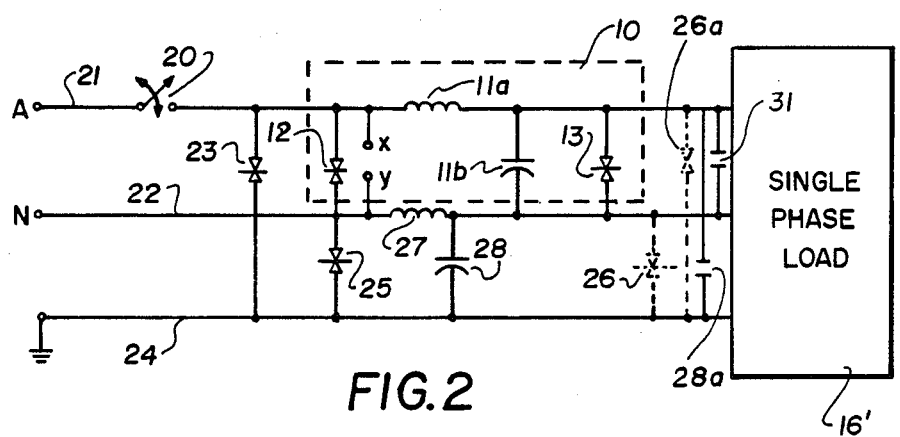
FIG. 2 is a schematic illustration of one preferred embodiment of the invention utilizing the surge protector/filter network for protection of a single phase load.

Referring now to FIG. 2, the protective apparatus of the present invention is depicted as providing power surge and transient protection for a single-phase load 16' from a supply voltage, of say 120-volt, 60-cycles, appearing across the respective line and neutral terminals A and N, this input power normally being supplied, as is conventionally known, from the output of a distribution transformer (not shown).

In the manner similar to that previously described with respect to FIG. 1, the protector/filter network 10 is connected intermediate the voltage supply terminals and the single phase load (with the "source" and "load" voltage suppressors being connected across the supply and neutral lines 21 and 22). In this preferred embodiment, however, an additional voltage suppressor 23 is connected between supply line 21 and ground line 24. Furthermore, an additional voltage suppressor 25 (and an optional voltage suppressor 26) is connected between neutral and ground with inductor 27 and capacitors 28 and 28a connected in the manner shown to provide conventional filtering between neutral and ground and line to ground. An optional voltage suppressor 26a may be connected line-to-ground with capacitor 31 being optionally connected at the input to load 16' between line and neutral. As a specific feature of the embodiment depicted in FIG. 2, additional output terminals X-Y can be provided at the output of the "source" suppressor 12, as depicted, for supplying power directly to an alternate load (not shown).

Associated with the protector network is a circuit breaker 20 disposed in the line 21, this breaker switch being located either immediately adjacent to, or remotely disposed from, the network 10. In addition to the circuit breaker, it may be desirable to provide other protective devices at the "input" side of the protector network 10 shown in FIG. 2, such as temperature sensors and ground fault responsive switches, for interrupting power to the load 16' under certain detrimental conditions.

Figure 3:
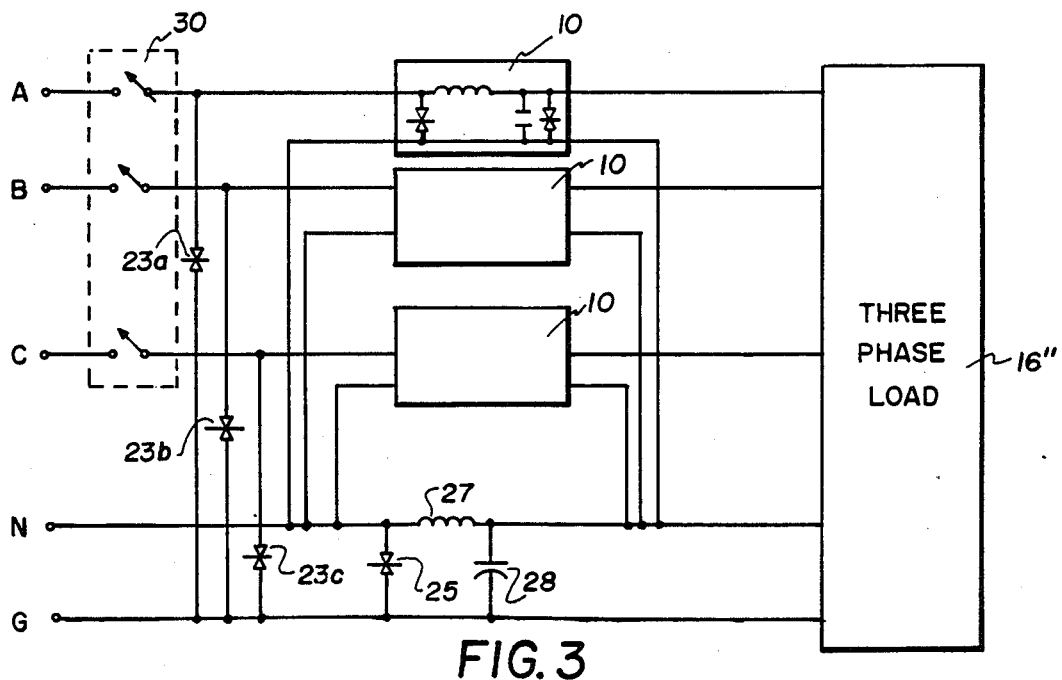
FIG. 3 is a block diagram schematic illustration of another preferred embodiment of the invention utilizing the surge protector filter network for protection of a polyphase load.

Referring now to FIG. 3, the protective apparatus of the present invention is depicted as providing surge and transient voltage protection for a 3-phase load 16". Accordingly, in this embodiment, a surge voltage protector and filter network 10 is provided in each of the 3-phase system with the voltage suppressors being connected across the neutral and respective supply lines (from 3-phase input terminals A, B, and C). As depicted, each of the networks is coupled between the circuit breaker 30 and the input to the 3-phase load 16".

For additional protection at the input side of the system, respective voltage suppressors 23a, 23b, and 23c are connected between each supply line and ground. In the manner similar to that described with respect to the single-phase load embodiment of FIG. 2, the voltage suppressor 25 is connected between neutral and ground with inductor 27 and capacitor 28 connected in the manner shown to provide conventional filtering. It is to be understood, of course, that additional suppressors and filter capacitors can be connected between phases, i.e. across the supply lines.

As an additional feature of the present invention, and as depicted in FIG. 4, the protective network arrangement is particularly adaptable for convenient installation with, and protection of, multiple type loads. Specifically, the embodiment depicted in FIG. 4 is essentially identical to that depicted in FIG. 3; but by tapping off selected ones of the supply lines and the neutral, power may be supplied not only to the three-phase load 16", but also simultaneously to other single or multiple phase loads with all of the loads thereby being protected by the networks 10 (and additional suppressors 23a, 23b, 23c, and 25, for example). For example, FIG. 4 depicts (for a voltage source of 120/208 volts) two additional single phase leads 16' and 16''', it being understood that these are only illustrative of additional loads that may be utilized. This arrangement then enables the convenient installation of the system shown in FIG. 4 in a single housing with provision being made, for example, by way of a mounting plate or template, for plugging in the loads 16', 16'', and 16''' for interconnection with the protective network.

Various modifications to the disclosed embodiments, as well as alternate embodiments, of the present invention may become apparent to one skilled in the art without departing from the scope and spirit of the invention as defined by the appended claims.

What is claimed is:

1. In a system wherein a-c power is supplied to a load from an a-c voltage source, the improvement comprising:

(a) a protector network disposed between said voltage source and said load, said protector network comprising a first voltage suppressor at the source side of said network connected across the supply lines from said source, a second voltage suppressor at the load side of said network connected across the supply lines to said load, the minimum breakdown voltage of the said first suppressor being that voltage, above which would damage the load, whereby the breakdown of the first voltage suppressor results in the voltage across the load being below that which would damage the load and protecting said load from power surges and voltage transients occurring at said source side; and (b) filter means disposed between said first and second voltage suppressors for filtering the power to said load, said second voltage suppressor being effective to protect the load from conditions occurring at the load side.

2. The improvement as defined in claim 1 wherein the breakdown voltage of the second voltage suppressor is that voltage, above which would damage the load.

3. A protective circuit for installation in a network wherein a-c power is supplied to an a-c load from an a-c voltage source, said protective circuit being disposed between said source and said load and effective to prevent damage to said load from transient conditions occurring at both the source and load sides of said network, said protective circuit comprising:

a first voltage suppressor at the source side of said network, a second voltage suppressor at the load side of said network, and filter means disposed between said first and second voltage suppressors for filtering the input power to said load, the voltage breakdown of said first voltage suppressor, as distinguished from the voltage breakdown of said second voltage suppressor, being principally effective to protect said load from transient conditions occurring at said source side, while the voltage breakdown of said second voltage suppressor, as distinguished from the voltage breakdown of said first voltage suppressor, being principally effective to protect said load from transient conditions occurring at said load side.

* * * * *